US010375012B2

(12) United States Patent
Kinder et al.

(10) Patent No.: US 10,375,012 B2
(45) **Date of Patent: *Aug. 6, 2019**

(54) MANAGED LDAP ENTRIES

(71) Applicant: RED HAT, INC.

(72) Inventors: Nathan G. Kinder, Castro Valley, CA (US); Simo Sorce, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,546

(22) Filed: Jun. 5, 2017

(65) Prior Publication Data

US 2017/0272399 A1 Sep. 21, 2017

Related U.S. Application Data

(63) Continuation of application No. 12/912,541, filed on Oct. 26, 2010, now Pat. No. 9,674,138.

(51) Int. Cl.
*H04L 29/12* (2006.01)

(52) U.S. Cl.
CPC ................ *H04L 61/1523* (2013.01)

(58) Field of Classification Search
CPC ................ H04L 61/1523
See application file for complete search history.

(56) References Cited

U.S. PATENT DOCUMENTS 6,173,283 B1 1/2001 Kasso et al.
8,397,056 B1 * 3/2013 Malks ............ H04L 63/10 709/203
2003/0084069 A1 * 5/2003 Boreham ............ G06F 21/6227
2005/0102529 A1 * 5/2005 Buddhikot ............ H04L 63/02 726/26
2006/0136465 A1 * 6/2006 Crim ............ G06F 16/2379
2006/0230121 A1 10/2006 Arndt et al.
2007/0112790 A1 5/2007 Harvey et al.
2008/0133480 A1 * 6/2008 Rowley ............ H04L 29/12132
2008/0162427 A1 * 7/2008 Connearney ............ G06F 16/284
2011/0264781 A1 * 10/2011 Moser ............ H04L 61/1523 709/223
2013/0246925 A1 * 9/2013 Ahuja ............ H04L 63/1416 715/738

FOREIGN PATENT DOCUMENTS

EP 1291783 A1 * 3/2003 ....... G06F 17/30289
EP 1291783 A1 * 3/2003 ............ G06F 16/21

* cited by examiner

*Primary Examiner* — Tonia L Dollinger
*Assistant Examiner* — Steven C Nguyen
(74) *Attorney, Agent, or Firm* — Lowenstein Sandler LLP

(57) ABSTRACT

A method and apparatus for maintaining in a Lightweight Directory Access Protocol (LDAP) repository entries that are managed by an LDAP directory server. An LDAP directory server receives a client request to add a specified entry to an LDAP repository, determines, based on a managed entry configuration, that the specified entry requires a managed entry operation, and adds the specified entry to the LDAP repository. The LDAP directory server further adds a managed entry to the LDAP repository in accordance with the managed entry operation, where the managed entry is added to the LDAP repository without receiving any client request specifying the managed entry.

20 Claims, 11 Drawing Sheets

502

```
cn=UPG Definition,cn=Managed Entries,cn=plugins,cn=config
objectclass: extensibleObject
cn: UPG Definition
originScope: cn=users,dc=example,dc=com
originFilter: objectclass=posixAccount
managedBase: cn=groups,dc=example,dc=com
managedTemplate: cn=UPG Template,dc=example,dc=com
```

504 — originScope; 506 — originFilter; 508 — managedBase; 510 — managedTemplate

514

```
dn: cn=UPG Template,dc=example,dc=com
objectclass: mepTemplateEntry
cn: UPG Template
mepRDNAttr: cn
mepStaticAttr: objectclass: posixGroup
mepMappedAttr: cn: $uid
mepMappedAttr: gidNumber: $gidNumber
mepMappedAttr: description: User private group for $uid
```

516 — mepRDNAttr; 518 — mepStaticAttr; 520 — mepMappedAttr lines

FIG. 5

MANAGED LDAP ENTRIES

RELATED APPLICATION

This application is a continuation of U.S. patent application Ser. No. 12/912,541, filed Oct. 26, 2010, which is hereby incorporated by reference in its entirety.

TECHNICAL FIELD

Embodiments of the present invention relate to a Lightweight Directory Access Protocol (LDAP), and more specifically to maintaining entries in an LDAP repository that are managed by an LDAP directory server.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

Typically, an LDAP directory server adds entries to the LDAP directory in response to requests received from various clients. In particular, each time a user of a client device wants to add an entry to the LDAP directory, the client has to submit a request to the LDAP directory server specifying a desired entry. For example, if a system administrator wants to add an LDAP entry for person A and an entry for a private group of person A, the system administrator has to request the addition of both entries and has to separately specify attributes for each entry, even tough many of these attributes are identical (e.g., the user name and user ID). If the system administrator sends a request to change some attributes in the entry of person A, the system administrator has to remember to also request a change of the corresponding attributes in the corresponding private group entry.

BRIEF DESCRIPTION OF THE DRAWINGS

The present invention is illustrated by way of example, and not by way of limitation, in the figures of the accompanying drawings and in which:

FIG. 5 illustrates exemplary configuration entries for a managed entry plugin in an LDAP repository in accordance with some embodiments.

DETAILED DESCRIPTION

Described herein is a method and apparatus for maintaining entries in an Lightweight Directory Access Protocol (LDAP) directory that are managed by an LDAP directory server. In one embodiment, when an LDAP directory server receives a client request to add a specified entry to an LDAP repository, the LDAP directory server determines whether the specified entry requires a managed entry operation based on managed entry configuration information. If not, the LDAP directory server adds the specified entry to the LDAP repository. If so, the LDAP directory server not only adds the specified entry to the LDAP repository but also adds a corresponding managed entry to the LDAP repository in accordance with the managed entry operation, where the managed entry is added to the LDAP repository without receiving any client request specifying the managed entry. In one embodiment, the managed entry is of a different type than the specified entry. For example, the specified entry may be an entry for person A and the managed entry may be an entry for a private group of person A.

Accordingly, with embodiments of the present invention, some LDAP repository entries can be created and managed exclusively by an LDAP directory server. A user only needs to configure the LDAP directory server to trigger a managed entry operation for a particular type of origin entries, and the LDAP directory server will automatically create a managed entry when adding a client-specified origin entry of the particular type to the LDAP repository, and will automatically modify, delete or rename the managed entry upon receiving a client request to modify, delete or rename the origin entry.

In the following description, numerous details are set forth. It will be apparent, however, to one skilled in the art, that the present invention may be practiced without these specific details.

Figure 1:
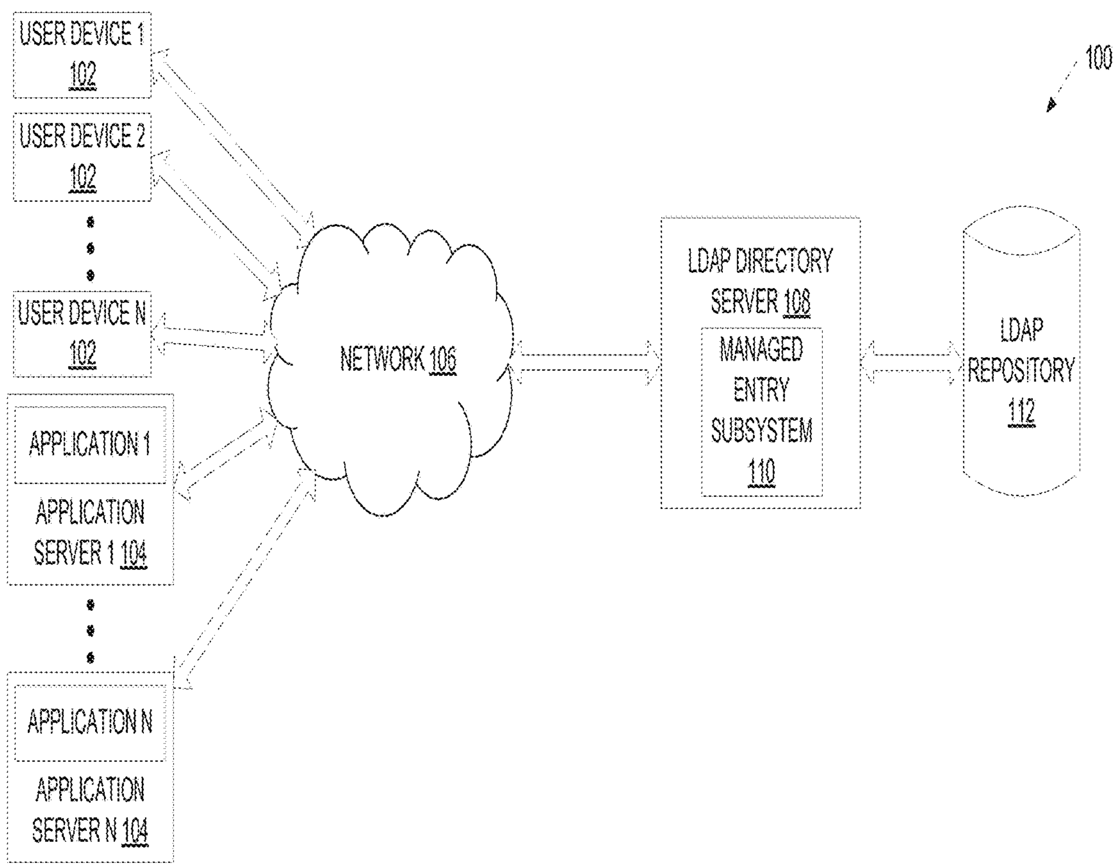
FIG. 1 illustrates a network architecture in which embodiments of the present invention may be implemented.

FIG. 1 illustrates an exemplary network architecture 100 in which embodiments of the present invention may operate. The network architecture 100 may include user devices 102, an LDAP directory server 108 and a network 106. The user devices 102 may be, for example, personal computers (PCs), mobile phones, palm-sized computing devices, personal digital assistants (PDAs), etc. The LDAP directory server 108 may include one or more server computers, desktop computers, etc.

The user devices 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the user devices 102 communicate with the LDAP directory server 108 via a web server (not shown). For example, the user devices 102 may host web browsers that communicate with the web server using HTTP to request information. The web server may then communicate with the LDAP directory server 108 using LDAP to retrieve requested information from an LDAP repository 112. Alternatively, the user devices 102 may communicate directly with the LDAP directory server 108 using LDAP to request information stored in the LDAP repository 112.

The network architecture 100 may also include one or more application servers 104 that host various applications requesting information from the LDAP directory server 108. The application servers 104 may include one or more server computers, desktop computers, etc. Similarly to the user devices 102, the application servers 104 may communicate with the LDAP directory server 112 directly or via a web server. The application servers 104 and the user devices 102 operate as clients in communications with the LDAP directory server 112, and are referred to herein as client devices or simply clients.

The LDAP directory server 108 maintains an LDAP repository 112 residing on one or more mass storage devices, such as magnetic or optical storage based disks, solid-state drives, tapes or hard drives. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain). Depending on the class, an entry may have a set of mandatory attributes and a set of optional attributes. For example, an entry that belongs to the "person" class would contain mandatory attributes such as surname ("sn") and common name ("cn"), and optional attributes such as "userPassword", "telephoneNumber", and others.

When clients 102 and 104 need to add an entry to the LDAP repository 112, they send an add request to the LDAP directory server 108, specifying the attributes for the new entry. In one embodiment, when a client tries to add a new entry, the LDAP directory server 108 will also add a second related entry, without an explicit request from the client. For example, if a client sends a request to add an entry for person A, the LDAP directory server 108 not only adds the requested entry for person A but also an additional entry for a private group of person A. The additional entry has not been requested or specified by any client. Rather, the additional entry is added automatically and can be managed exclusively by the LDAP directory server (i.e., it can be modified, deleted or renamed only by the LDAP directory server 108 and not by any clients or other entities). Such additional entries are referred to herein as managed entries and the entries that trigger the creation of managed entries are referred to herein as origin entries. In some embodiments, an origin entry and a corresponding managed entry are of two different types. For example, they may belong to two different object classes, or two different organizational units, or two different domains. In the example above, the origin entry may belong to the organizational unit "people" and the managed entry may belong to the organizational unit "groups".

In one embodiment, the LDAP directory server includes a managed entry subsystem 110 that is responsible for the creation and maintenance of managed entries in the LDAP repository 112. The managed entry subsystem 110 may be a plugin, a module or an independent program. The managed entry subsystem 110 maintains managed entry configuration information that specifies the type of origin entries triggering the creation of a managed entry and the attributes to be included in the managed entry. The managed entry configuration information may be stored in the LDAP repository (e.g., as one or more LDAP entries) or in any other data store accessible to the managed entry subsystem 110. Upon receiving a client request to add a specified entry to the LDAP repository 112, the managed entry subsystem 110 checks the managed entry configuration information to determine whether the specified entry is of the type that triggers a managed entry operation (an operation involving a managed entry associated with this type of origin entry). If not, the managed entry subsystem 110 adds the specified entry to the LDAP repository 112. If so, the managed entry subsystem 110 not only adds the specified entry ("origin entry") to the LDAP repository 112 but also adds a corresponding managed entry to the LDAP repository 112 in accordance with the managed entry operation. Subsequently, when a client sends a request to modify, delete or rename the origin entry, the managed entry subsystem 110 ensures that a respective operation is performed on the managed entry as well.

Figure 2:
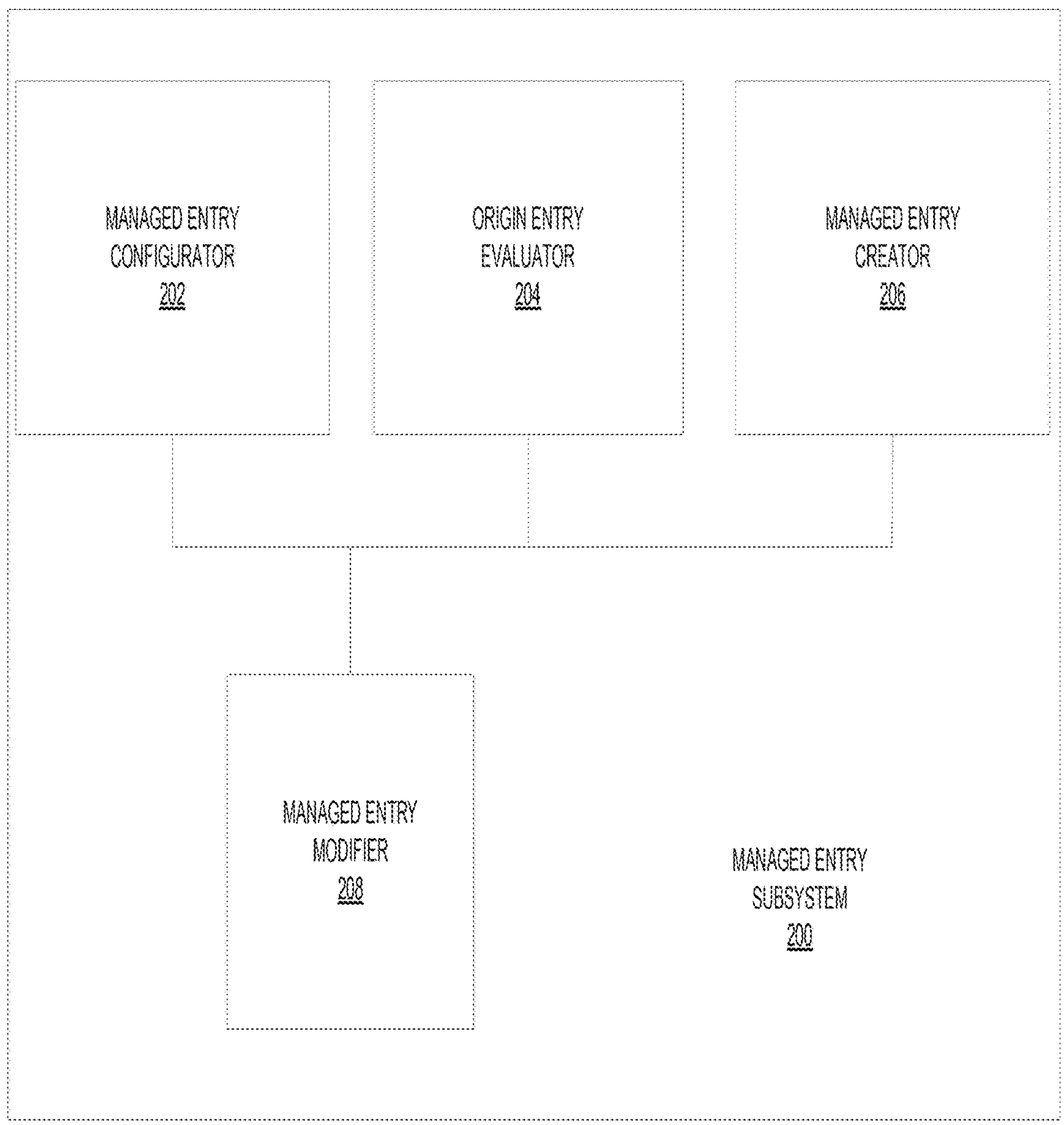
FIG. 2 is a block diagram of one embodiment of a managed entry subsystem.

FIG. 2 is a block diagram of one embodiment of a managed entry subsystem 200. The managed entry subsystem 200 may be the same as the managed entry subsystem 110 and may include a managed entry configurator 202, an origin entry evaluator 204, a managed entry creator 206, and a managed entry modifier 208. The above components of the managed entry subsystem 200 are logical components, and the managed entry subsystem 200 may include more or less components than shown in FIG. 2 without loss of generality.

The managed entry configurator 202 is responsible for configuring managed entry operations in an LDAP repository. Configuration information may be provided by a user (e.g., a system administrator) and may specify types of origin entries triggering the creation of managed entries and the attributes to be included in managed entries. In one embodiment, the configuration information includes parameters that need to be satisfied by an origin entry in order to trigger a managed entry operation. These parameters may include, for example, a specific object class of an origin entry, a specific domain component ("dc") of the origin entry, a specific organizational unit ("ou") of the origin entry, and the like. In addition, the configuration information may specify attributes that need to be included in the managed entry and which of these attributes are linked to the attributes of the origin entry.

The managed entry configurator 202 may maintain an LDAP entry for configuration information of a managed entry in the LDAP repository. Alternatively, the managed entry configurator 220 may maintain two LDAP records for each type of managed entry (e.g., an entry defining an origin entry and an entry defining a managed entry). Yet alternatively, the managed entry configurator 220 may maintain configuration information of a managed entry in a separate data store, independent of the LDAP repository.

The origin entry evaluator 204 evaluates each client request to determine whether the client request involves an entry that triggers a managed entry operation. The origin entry evaluator 204 makes this determination using the managed entry configuration information. In particular, if the origin entry specified in the client request does not satisfy the origin entry parameters contained in the managed entry configuration information, the origin entry evaluator 204 does not initiate a managed entry operation. Otherwise, if the entry specified in the client request satisfies the parameters contained in the managed entry configuration information, the origin entry evaluator 204 identifies an operation requested by the client with respect to the origin entry. If the client has requested to add an origin entry to the LDAP repository, the origin entry evaluator 204 invokes the managed entry creator 206 to add an associated managed entry.

Alternatively, if the client has requested to modify, delete or rename an origin entry, the origin entry evaluator 204 invokes the managed entry modifier 208 to modify, delete or rename an associated managed entry. Yet alternatively, the client may request to delete, modify or rename a previously-created managed entry. In response, in one embodiment, the origin entry evaluator 204 denies the client request, only allowing the managed entry subsystem 200 itself to request the above operations for managed entries. In another embodiment, the managed entry configurator 202 receives user input for a managed entry update option, specifying whether any of the above client requests (a client request to delete a previously-created managed entry, a client request to modify a previously-created managed entry or a client request to rename a previously-created managed entry) should be allowed. In this other embodiment, upon receiving a client request to delete, modify or rename a previously-created managed entry, the origin entry evaluator 204 either allows or denies the client request depending on the configuration parameter of the managed entry update option.

The managed entry creator 206 creates a managed entry using the attributes provided in the managed entry configuration information that is associated with an origin entry specified in a current client request. Upon adding the managed entry to the LDAP repository, the managed entry creator 206 adds to the associated origin entry an identifier of the managed entry (e.g., the DN of the managed value).

The managed entry modifier 208 is responsible for updating, deleting and modifying managed entries when respective operations are specified in client requests. In particular, if the client requests to delete an origin entry that triggers a managed entry operation, the managed entry modifier 208 deletes the origin entry and an associated managed entry (if it exists). If the client requests to rename an origin entry that triggers a managed entry operation, the managed entry modifier 208 renames the origin entry and an associated managed entry (if it exists). If the client requests to update an origin entry that triggers a managed entry operation, the managed entry modifier 208 updates specified attributes of the origin entry and determines whether any of the updated attributes are mapped to attributes of an associated managed entry. If so, the managed entry modifier 208 updates the corresponding attributes of the managed entry.

Figure 3:
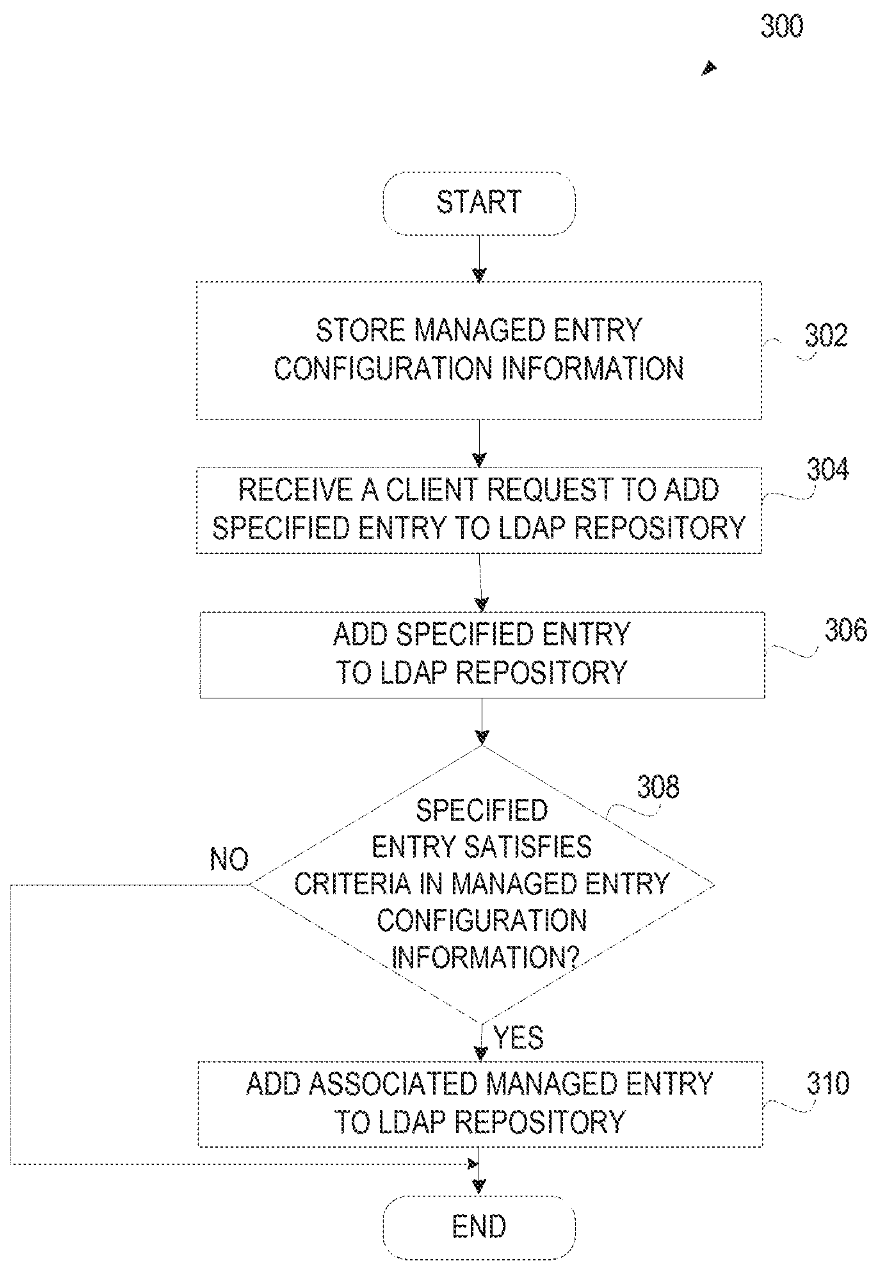
FIG. 3 is a flow diagram of one embodiment of a method for maintaining entries in an LDAP repository that are managed by an LDAP directory server.

FIG. 3 is a flow diagram of one embodiment of a method 300 for maintaining entries managed by an LDAP directory server in an LDAP repository. The method may be performed by processing logic that may comprise hardware (e.g., circuitry, dedicated logic, programmable logic, microcode, etc.), software (such as instructions run on a processing device), or a combination thereof. In one embodiment, method 300 is performed by the LDAP directory server 108 of FIG. 1.

Referring to FIG. 3, method 300 begins with the LDAP directory server receiving and storing managed entry configuration information (block 302). The managed entry configuration information may be stored in the LDAP repository or a designated data store. One embodiment of maintaining managed entry configuration information in an LDAP repository will be discussed in more detail below in conjunction with FIG. 4.

Subsequently, at block 304, the LDAP directory server receives a client request to add a specified entry to the LDAP repository. At block 306, the LDAP directory server adds the specified entry to the LDAP repository (block 310). At block 308, the LDAP directory server determines whether the specified entry satisfies origin entry parameters contained in the configuration information. If not, method 300 ends. If so, the LDAP directory server adds an associated managed entry to the LDAP repository (block 310). One embodiment of a method for adding a managed entry will be discussed in more detail below in conjunction with FIG. 6.

Figure 4:
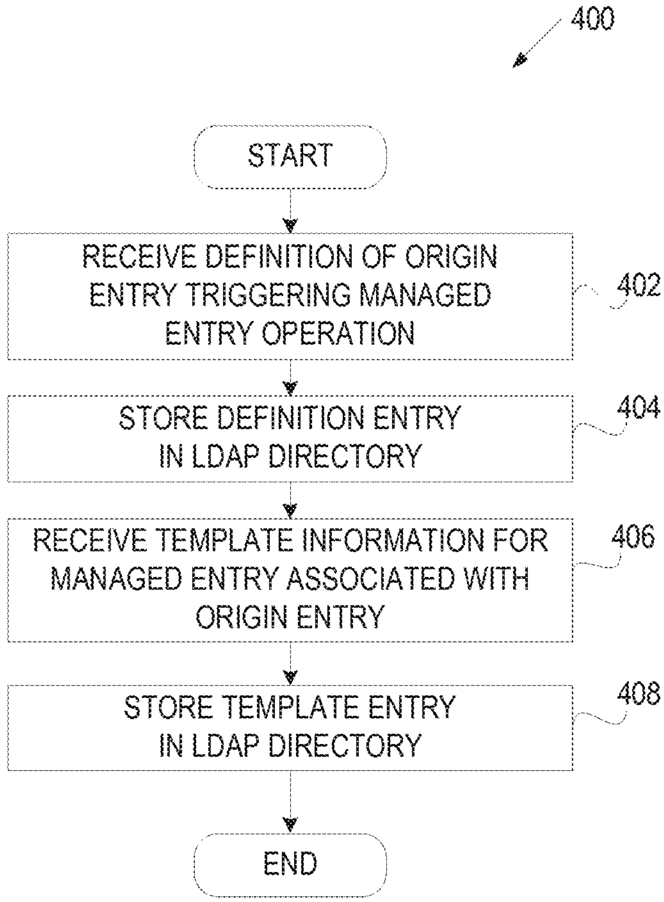
FIG. 4 is a flow diagram of one embodiment of a method for a managed entry configuration.

FIG. 4 is a flow diagram of one embodiment of a method 400 for maintaining managed entry configuration information in an LDAP repository. The method may be performed by processing logic that may comprise hardware (e.g., circuitry, dedicated logic, programmable logic, microcode, etc.), software (such as instructions run on a processing device), or a combination thereof. In one embodiment, method 400 is performed by a managed entry subsystem 110 of FIG. 1. In the described embodiment, the managed entry subsystem is implemented as a plugin. However, as discussed above, the managed entry subsystem can alternatively be implemented as a module, sub-module, independent application or any other programmable component.

Referring to FIG. 4, method 400 begins with the managed entry subsystem receiving (e.g., from a system administrator or another user) a definition of an origin entry that should trigger a managed entry operation (block 402) and storing the definition of the origin entry in an LDAP directory (block 404). In one embodiment, the definition of the origin entry is stored in the LDAP directory as a separate entry. FIG. 5 illustrates an exemplary LDAP entry 502 defining an origin entry, in accordance with one embodiment of the invention.

Referring to FIG. 5, an exemplary LDAP definition entry 502 may include its identifying information ("cn" of entry 502 and "cn" of its parent entries) and its object class. In addition, the definition entry 502 may include parameters that need to be satisfied by an origin record in order to trigger a managed entry operation. The parameters are defined using a search scope attribute 504 and a search filter attribute 506. In addition, the entry 502 includes a managed entry base attribute 508 that defines where an associated managed entry should be located and a managed entry template attribute 510 that points to a managed entry template that defines the content of the managed entry. In one embodiment, the definition entry 502 is located in cn=config beneath a configuration entry for the managed entry plugin.

Returning to FIG. 4, the managed entry subsystem further receives (e.g., from a system administrator or another user) template information for a managed entry associated with the above origin entry (block 406), and stores the template information in the LDAP repository (block 408). In one embodiment, the template information of the associated managed entry is stored in the LDAP directory as a separate LDAP template entry.

Referring again to FIG. 5, an exemplary LDAP template entry 514 may include its identifying information ("dn" and "cn" of entry 514) and its object class. In addition, the template entry 514 includes static attribute/value pairs and mapped attributes. The static attribute/value pairs may be used as-is when creating a new managed entry. The mapped attributes may be used to define attributes where the value(s) in the managed entry come from an attribute in the origin entry. The static attributes may include mepStaticAttr attribute 518 that defines static attribute/value pairs to be used when the managed entries are created. The attribute 518 may only be used during creation of the managed entry since there is no need to ever update the static value when a change is made to the origin entry. The mapped attributes include mepRDNAttr attribute 516 that defines the attribute to use as the RDN of the managed entries and mepMappedAttr attributes 520 that define attributes whose values are mapped to attributes in the origin entry, where "mep" in the mepMappedAttr 520 indicates that the mapping will be used by a managed entry plugin that represents an exemplary implementation of a managed entry subsystem. In some embodiments, only part of the value of a managed entry attribute is mapped to a value of an origin entry attribute. For example, a managed entry may have an email address attribute whose value is a combination of a user last name and "@example.com", and the last name part of the email attribute value may be mapped to the user last name ("sn") in the origin entry.

In one embodiment, in which the definition entry includes a pointer to the template entry 514, the template entry 514 can be located anywhere in the tree of the LDAP repository. In some embodiments that use replication of the LDAP repository, the template entry 514 is located in the replicated tree to ensure that all master copies use the same template.

FIGS. 6, 7, 8, 9 and 10 are flow diagrams of various embodiments of methods for handling operations pertaining to managed entries. The methods may be performed by processing logic that may comprise hardware (e.g., circuitry, dedicated logic, programmable logic, microcode, etc.), software (such as instructions run on a processing device), or a combination thereof. In some embodiments, the methods are performed by a managed entry subsystem 110 of FIG. 1.

Figure 6:
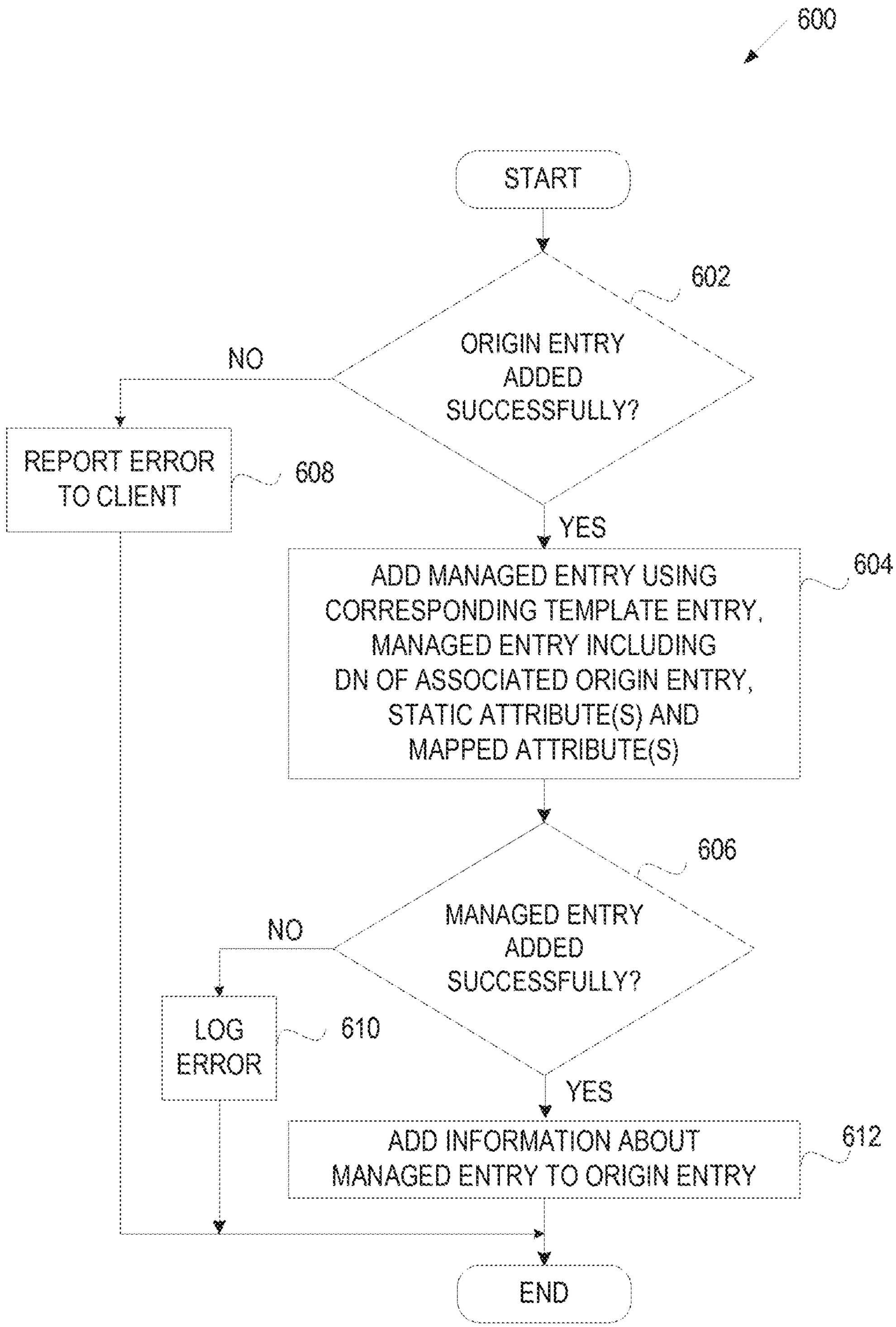
FIG. 6 is a flow diagram of one embodiment of a method for adding a managed entry to an LDAP repository.

FIG. 6 illustrates one embodiment of a method 600 for adding a managed entry to an LDAP repository. Method 600 begins with the managed entry subsystem attempting to add an origin entry to the LDAP repository in response to a client request, determining that the origin entry triggers a managed entry operation and determining whether the origin entry has been added successfully (block 602). In one embodiment, the managed entry subsystem determines that the origin entry triggers a managed entry operation by accessing an LDAP definition entry and determining that the origin entry satisfies origin entry parameters in the definition record (e.g., originScope and originFilter attributes).

If the attempt to add the origin entry to the LDAP repository was unsuccessful, the managed entry subsystem reports an error to the client. Otherwise, if the origin entry was successfully added to the LDAP repository, the managed entry subsystem determines what attributes should be included in a managed entry associated with the origin entry and attempts to add the managed entry to the LDAP repository (block 604). In one embodiment, the managed entry subsystem determines what attributes should be included in the managed entry based a template entry that can be located using a pointer specified in the definition entry. The attributes that should be included in the managed entry may include the DN of the associated origin entry, static attributes defined in the template entry and mapped attributes defined in the template entry. The value of each mapped attribute (or a relevant part of the value) may be mapped from the value of a corresponding attribute in the origin entry.

At block 606, the managed entry subsystem determines whether the managed entry has been successfully added to the LDAP repository. If not, the managed entry subsystem records an error in an error log (block 610). If so, the managed entry subsystem adds information identifying the managed entry to the origin entry (block 612). In one embodiment, the managed entry subsystem adds the mepOriginEntry object class to the origin entry, along with a mepManagedEntry attribute whose value is the DN of the associated managed entry.

Figure 7:
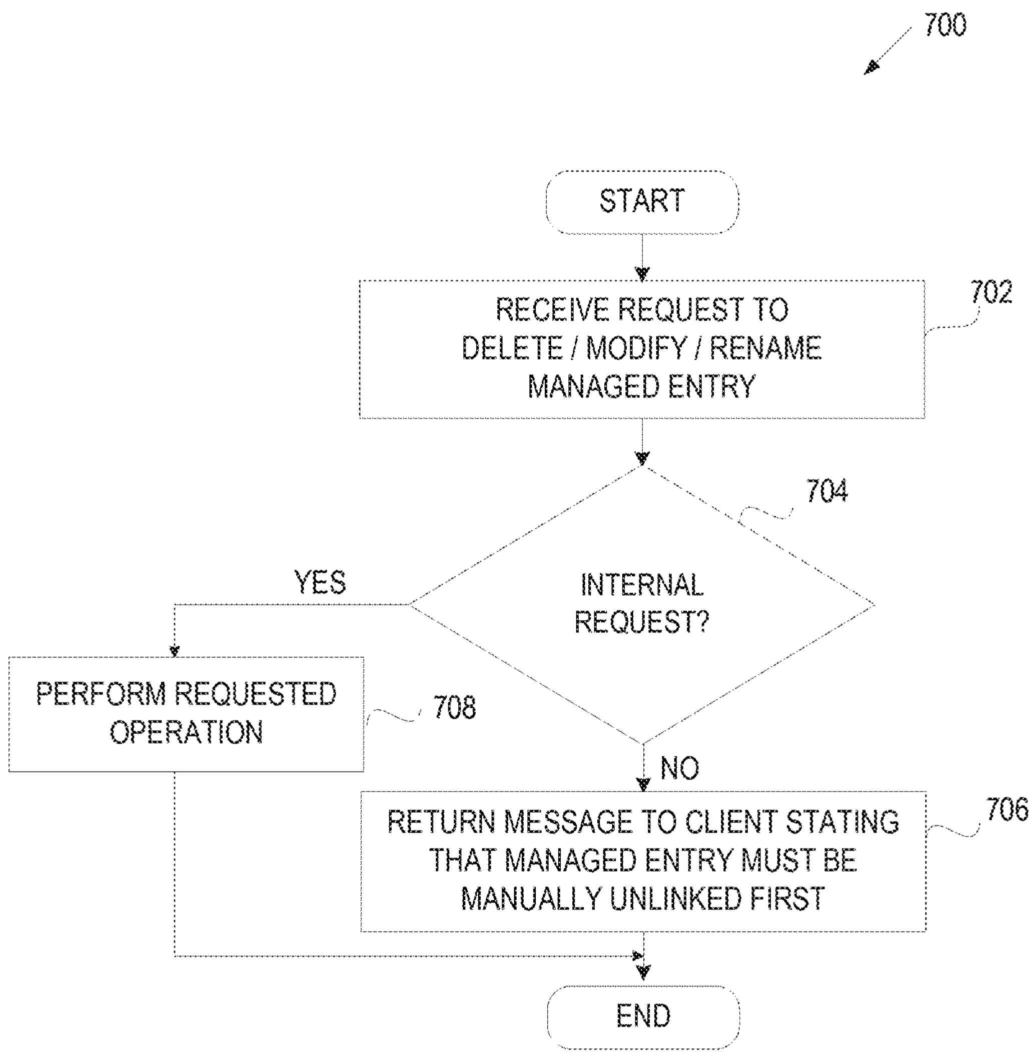
FIG. 7 is a flow diagram of one embodiment of a method for handling client requests pertaining to a managed entry.

FIG. 7 is a flow diagram of one embodiment of a method 700 for handling client requests pertaining to a managed entry. Method 700 begins with the managed entry subsystem receiving a request to delete, modify or rename a managed entry (block 702) and determining whether the request is an internal request (from the LDAP directory server) or a client request (block 704). If the request is internal, the managed entry subsystem performs the requested operation. Otherwise, if the request is from a client, the managed entry subsystem returns a message to the client informing the client that the managed entry must be manually unlinked from an associated origin entry prior to performing the requested operation.

Figure 8:
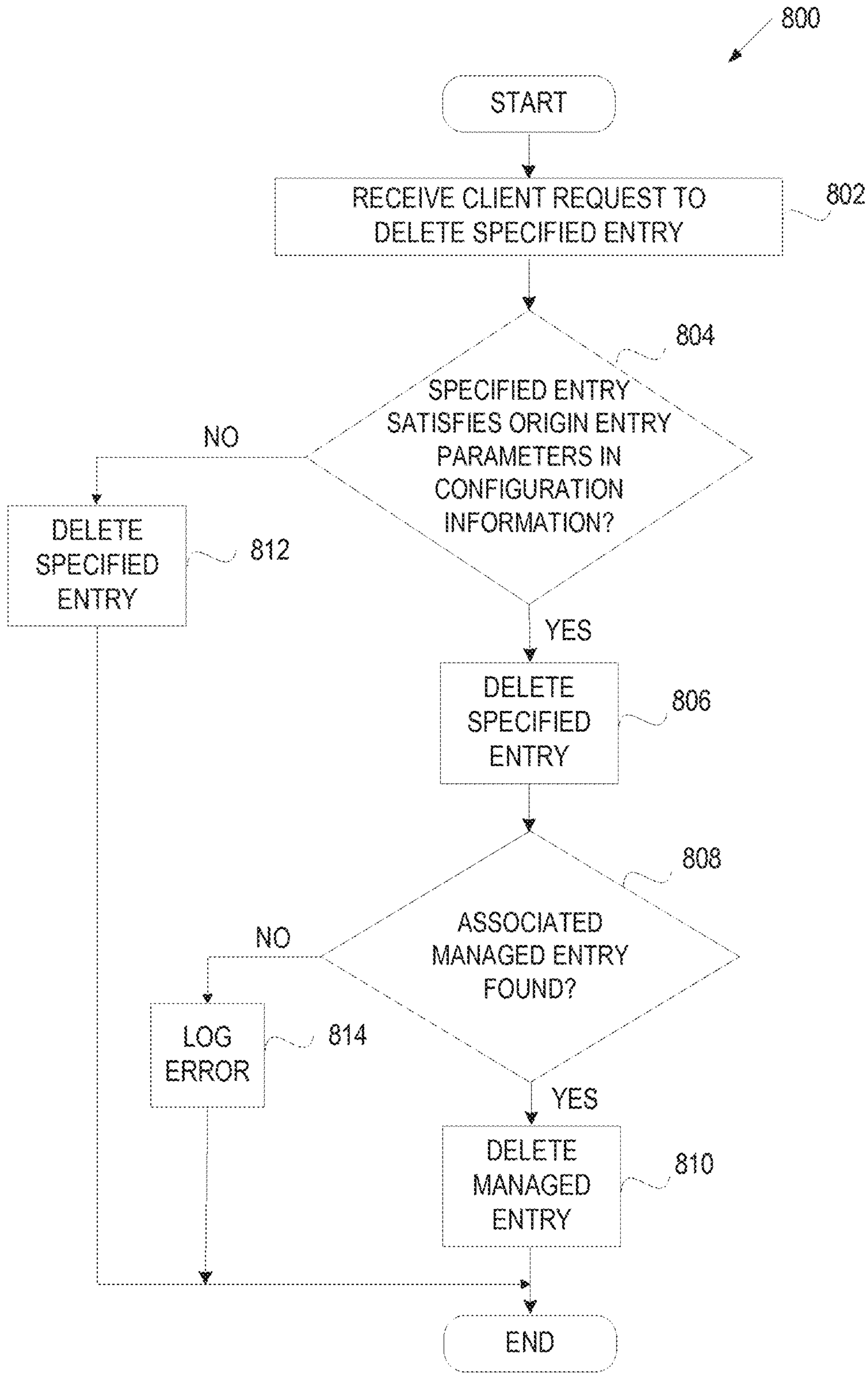
FIG. 8 is a flow diagram of one embodiment of a method for handling a delete operation concerning a managed entry.

FIG. 8 is a flow diagram of one embodiment of a method 800 for handling a delete operation concerning a managed entry. Method 800 begins with the managed entry subsystem receiving a client request to delete a specified entry (block 802) and determining whether the specified entry satisfies origin entry parameters in managed entry configuration information (e.g., originScope and originFilter attributes in a corresponding LDAP definition entry) (block 804). If not, the managed entry subsystem deletes the specified entry (block 812). If so, the managed entry subsystem deletes the specified entry (block 806) and looks for an associated managed entry. If an associated managed entry is found, the managed entry subsystem deletes the found entry (block 810). If an associated managed entry is not found, the managed entry subsystem records an error in an error log (block 814).

Figure 9:
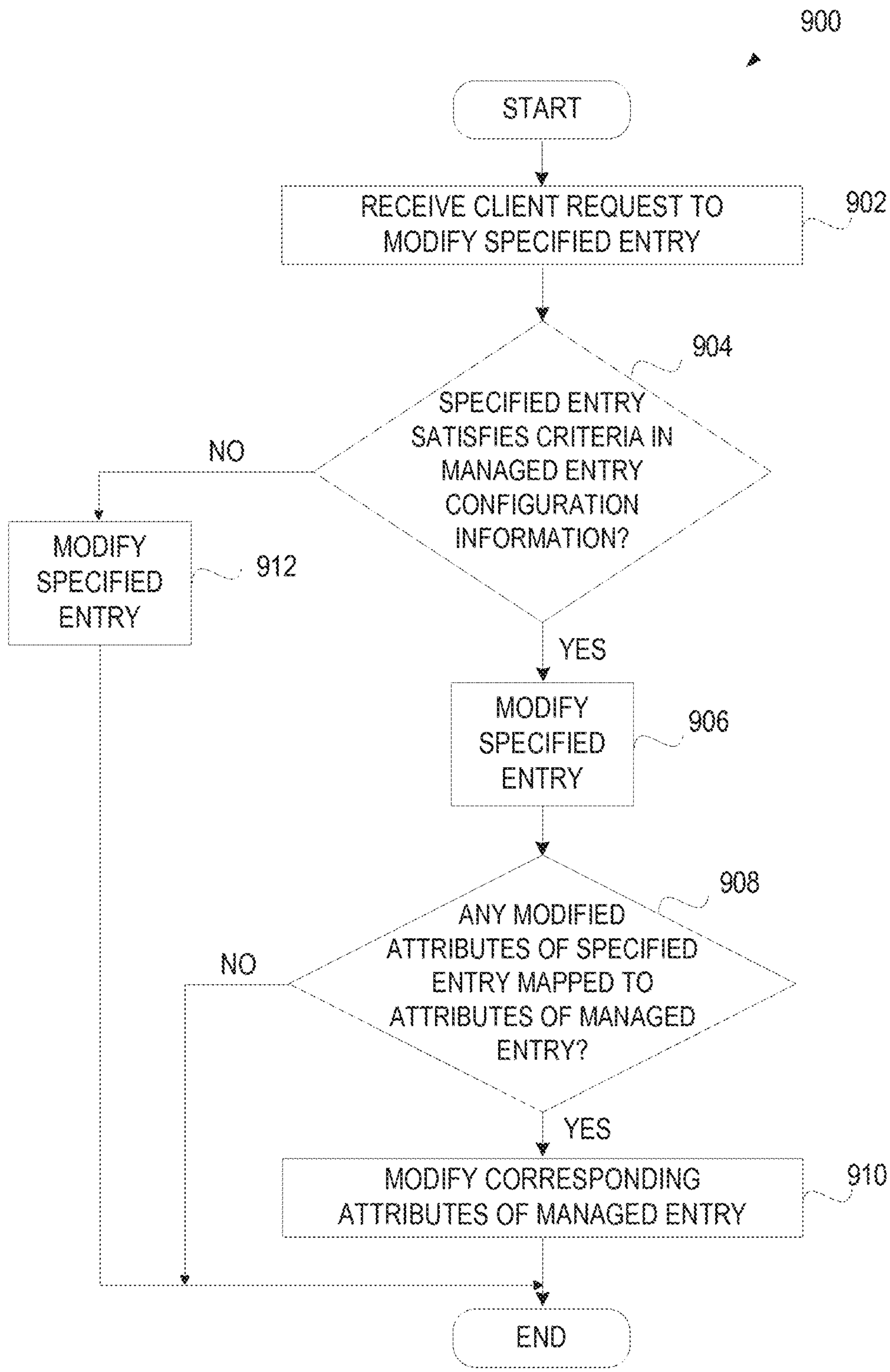
FIG. 9 is a flow diagram of one embodiment of a method for handling a modify operation concerning a managed entry.

FIG. 9 is a flow diagram of one embodiment of a method 900 for handling a modify operation concerning a managed entry. Method 900 begins with the managed entry subsystem receiving a client request to modify a specified entry (block 902) and determining whether the specified entry satisfies origin entry parameters in managed entry configuration information (e.g., originScope and originFilter attributes in a corresponding LDAP definition entry) (block 904). If not, the managed entry subsystem modifies the specified entry (block 912). If so, the managed entry subsystem modifies the specified entry (block 906) and determines whether any attributes of the specified entry that have been modified are mapped to attributes of an associated managed entry (block 908). If not, method 900 ends. If so, the managed entry subsystem modifies the mapped attributes of the managed entry using corresponding attributes of the origin entry (block 910) and method 900 ends.

Figure 10:
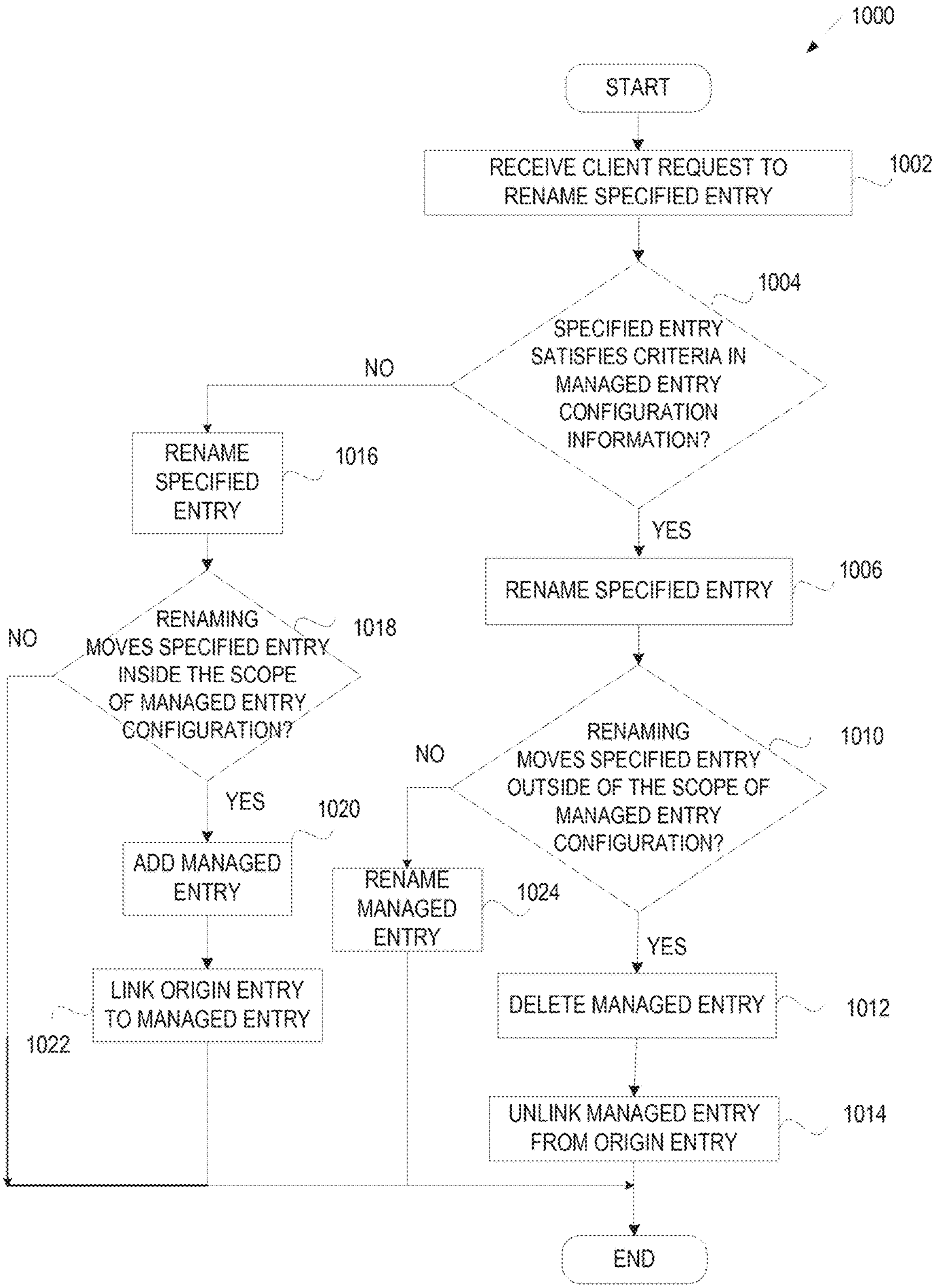
FIG. 10 is a flow diagram of one embodiment of a method for handling a rename operation concerning a managed entry.

FIG. 10 is a flow diagram of one embodiment of a method 1000 for handling a rename operation concerning a managed entry. Method 1000 begins with the managed entry subsystem receiving a client request to rename specified entry (block 1002) and determining whether the specified entry satisfies origin entry parameters in managed entry configuration information (e.g., originScope and originFilter attributes in a corresponding LDAP definition entry) (block 1004). If not, the managed entry subsystem renames the specified entry (block 1016) and determines whether the renaming has moved the specified entry into the scope of the managed entry configuration (block 1018). If not, method 1000 ends. If so, the managed entry subsystem treats the current client request as a request to add a new origin entry, adds a new managed entry to the LDAP repository in accordance with the managed entry configuration (block 1020) and links the renamed entry to the managed entry (block 1022).

If the specified entry satisfies origin entry parameters in the managed entry configuration information, the managed entry subsystem renames the specified entry (block 1006) and determines whether the renaming has moved the origin entry outside of the scope of the managed entry configuration (block 1010). If so, the managed entry subsystem deletes an associated managed entry (block 1012) and unlinks the managed entry from the origin entry (e.g., by removing the mepManagedEntry attribute and the mepOriginEntry object class from the origin entry) (block 1014). If the renaming did not move the origin entry outside of the scope of the managed entry configuration, the managed entry subsystem renames the managed entry (block 1024).

FIGS. 7 through 10 are directed to embodiments in which direct requests of clients to delete, modify or rename previously-created managed entries are denied only allowing the managed entry subsystem itself to request the above operations for managed entries. In other embodiments, however, some or all of such client requests may be allowed subject to a configuration parameter of a managed entry update option.

Figure 11:
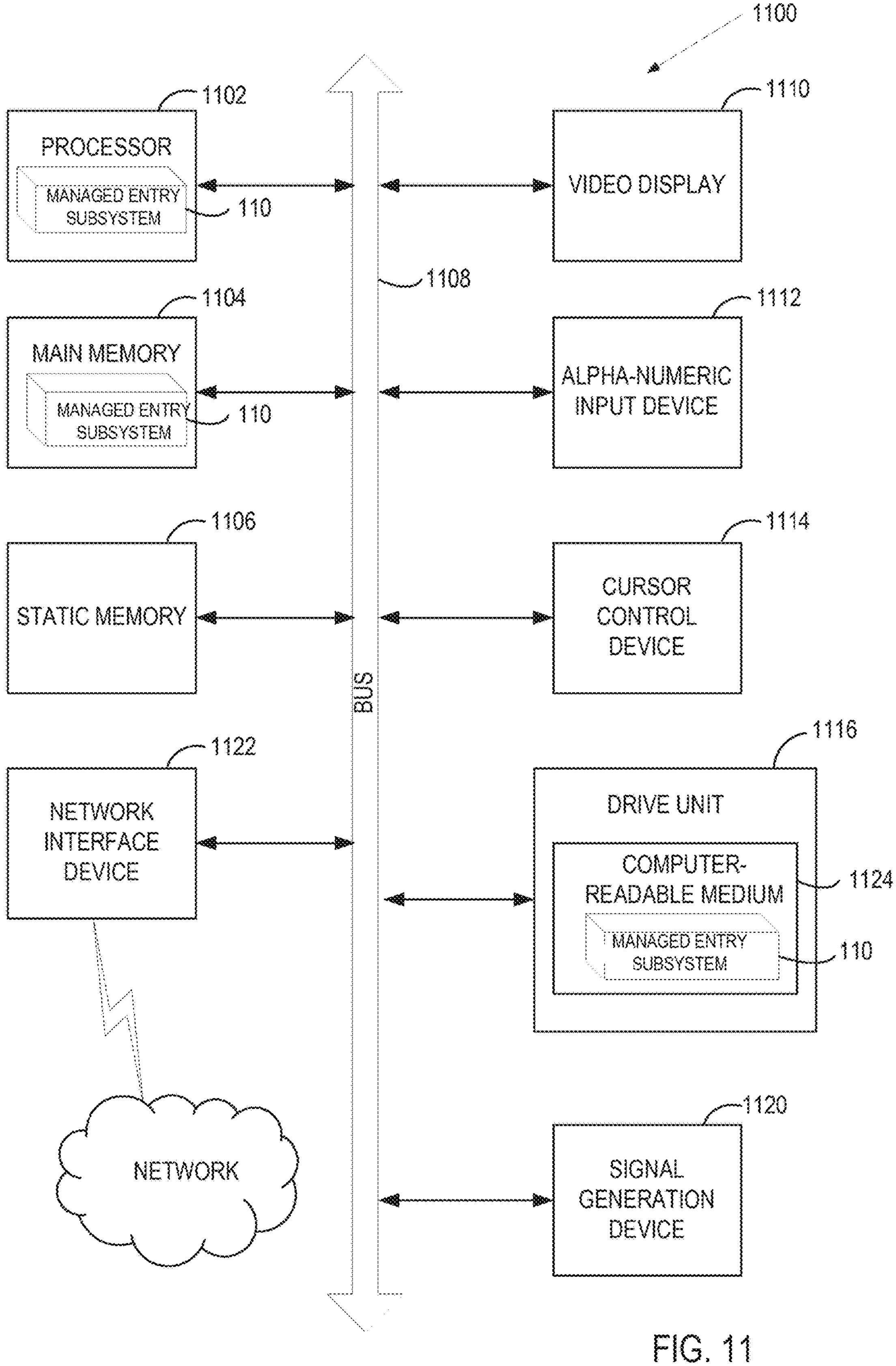
FIG. 11 illustrates a block diagram of an exemplary computer system hosting a managed entry subsystem.

FIG. 11 illustrates a diagrammatic representation of a machine in the exemplary form of a computer system 1100 hosting a managed entry subsystem. Within computer system 1100, a set of instructions for causing the machine to perform any one or more of the methodologies discussed herein may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The exemplary computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a drive unit 1116, which communicate with each other via a bus 1108.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions of a managed entry subsystem 110 for performing the operations and steps discussed herein.

The computer system 1100 may further include a network interface device 1122. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The drive unit 1116 may include a machine-readable storage medium 1124 (also known as a computer-readable medium) on which is stored one or more sets of instructions or software of the managed entry subsystem 110 embodying any one or more of the methodologies or functions described herein. The software 110 may also reside, completely or at least partially, within the main memory 1104 and/or within the processing device 1102 during execution thereof by the computer system 1100, the main memory 1104 and the processing device 1102 also constituting machine-readable storage media.

While the machine-readable storage medium 1124 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media Thus, techniques for maintaining entries in an LDAP repository that are managed by an LDAP directory server have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "determining" or "adding" or "maintaining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:

receiving, at a Light Weight Directory Access Protocol (LDAP) directory server, a client request from a client device to add a specified entry to a LDAP repository;

adding the specified entry to the LDAP repository;

storing, at the LDAP repository, a managed entry configuration in one or more configuration information entries of the LDAP repository, the managed entry configuration comprising a definition of an entry type triggering a managed entry operation, and template information for a managed entry;

determining, based on the managed entry configuration, that the specified entry has the entry type that triggers the managed entry operation involving the managed entry, the template information for the managed entry specifying one or more static attributes to be included in the managed entry upon creation of the managed entry;

creating the managed entry as a new entry that is separate from the specified entry and that comprises the one or more static attributes specified in the template information for the managed entry; and adding, by a processing device of the LDAP directory server, the created managed entry to the LDAP repository separate from the specified entry, wherein the managed entry is added in accordance with the managed entry operation and wherein the managed entry is managed by the LDAP directory server without any client interaction.

2. The method of claim 1 wherein:

the managed entry is created using an identifier of the specified entry, and at least one of the one or more static attributes or one or more mapped attributes linked to corresponding attributes of the specified entry; and adding the created managed entry to the LDAP repository comprises:

upon a successful addition of the managed entry to the LDAP repository, adding an identifier of the managed entry to the specified entry.

3. The method of claim 1 further comprising:

receiving a client request for an operation pertaining to the managed entry, the operation comprising any one of a deletion of the managed entry, a modification of the managed entry or a renaming of the managed entry;

refraining from performing the requested operation; and notifying the client device that the managed entry is to be manually unlinked prior to performing the requested operation.

4. The method of claim 1 wherein the managed entry is of a different type than the specified entry.

5. The method of claim 1 further comprising:

receiving a second client request of the client device for an operation pertaining to the specified entry from the LDAP repository;

determining, based on the managed entry configuration, that the specified entry has the entry type that triggers the managed entry operation involving the managed entry;

performing the requested operation for the specified entry from the LDAP repository; and performing the managed entry operation for the corresponding managed entry from the LDAP repository.

6. The method of claim 5 wherein the operation pertaining to the specified entry is a deletion of the specified entry, and the managed entry operation is a deletion of the corresponding managed entry; and wherein the method further comprises:

upon deleting the specified entry, determining whether the managed entry is present;

in response to the managed entry being present, deleting the managed entry from the LDAP repository; and in response to the managed entry not being present, recording an error in an error log.

7. The method of claim 5 wherein:

the operation pertaining to the specified entry is a modification of the specified entry; and the managed entry operation is a modification of attributes of the corresponding managed entry that are mapped to modified attributes of the specified entry.

8. The method of claim 5 wherein:

the operation pertaining to the specified entry is a renaming of the specified entry; and performing the managed entry operation comprises:

determining whether the renaming affects a scope of the managed entry configuration; and if the renaming does not affect the scope of the managed entry configuration, renaming the corresponding managed entry.

9. The method of claim 8 further comprising:

determining that the renaming is moving the specified entry outside of the scope of the managed entry configuration;

deleting the corresponding managed entry from the LDAP repository; and updating the specified entry to unlink the corresponding managed entry from the specified entry.

10. The method of claim 8 further comprising:

determining that the renaming is moving the specified entry into the scope of the managed entry configuration;

adding the corresponding managed entry to the LDAP repository; and updating the specified entry to link the corresponding managed entry to the specified entry.

11. The method of claim 1 wherein the entry type is defined by a schema, and the entry type is associated with a set of mandatory attributes and a set of optional attributes.

12. The method of claim 1 wherein the managed entry configuration information comprises parameters to be satisfied to trigger the managed entry operation.

13. The method of claim 1 wherein the template information is stored in the LDAP directory as a separate LDAP template entry.

14. The method of claim 13 wherein the separate LDAP template entry is located in a tree of the LDAP repository.

15. The method of claim 14 wherein the tree is a replicated tree and locating the separate LDAP template entry in the replicated tree ensures that master copies of the LDAP repository use a same template.

16. The method of claim 1 further comprising:
determining that an addition of the specified entry to the LDAP repository was unsuccessful; and
reporting an error to the client device.

17. The method of claim 1 further comprising:
determining that an addition of the managed entry to the LDAP repository was unsuccessful; and
recording an error in an error log.

18. The method of claim 1 further comprising:
receiving a request pertaining to the managed entry;
determining whether the request pertaining to the managed entry is an internal request or a client request;
responsive to determining that the request pertaining to the managed entry is an internal request, performing a requested operation on the managed entry; and
responsive to determining that the request pertaining to the managed entry is a client request, sending a message to the client device that a link between the managed entry and the specified entry is to be removed prior to performing the requested operation.

19. A system for a Light Weight Directory Access Protocol (LDAP) directory server, the system comprising:
a memory comprising an LDAP repository; and
a processor, coupled to the memory, to:
receive a client request from a client device to add a specified entry to the LDAP repository;
add the specified entry to the LDAP repository;
store, at the LDAP repository, a managed entry configuration in one or more configuration information entries of the LDAP repository, the managed entry configuration comprising a definition of an entry type triggering a managed entry operation, and template information for a managed entry;
determine, based on the managed entry configuration, that the specified entry has the entry type that triggers the managed entry operation involving the managed entry, the template information for the managed entry specifying one or more static attributes to be included in the managed entry upon the creation of the managed entry;
create the managed entry as a new entry that is separate from the specified entry and that comprises the one or more static attributes specified in the template information for the managed entry; and
add the created managed entry to the LDAP repository separate from the specified entry, wherein the managed entry is added in accordance with the managed entry operation and wherein the managed entry is managed by the LDAP directory server without any client interaction.

20. A non-transitory computer readable storage medium storing instructions which when executed cause a data processing system to perform operations comprising:
receiving, at a Light Weight Directory Access Protocol (LDAP) directory server, a client request from a client device to add a specified entry to a LDAP repository;
adding the specified entry to the LDAP repository;
storing, at an LDAP repository, a managed entry configuration in one or more configuration information entries of the LDAP repository, the managed entry configuration comprising a definition of an entry type triggering a managed entry operation, and template information for a managed entry;
determining, based on the managed entry configuration, that the specified entry has the entry type that triggers the managed entry operation involving the managed entry, the template information for the managed entry specifying one or more static attributes to be included in the managed entry upon creation of the managed entry;
creating the managed entry as a new entry that is separate from the specified entry and that comprises the one or more static attributes specified in the template information for the managed entry; and
adding the created managed entry to the LDAP repository separate from the specified entry, wherein the managed entry is added in accordance with the managed entry operation and wherein the managed entry is managed by the LDAP directory server without any client interaction.

* * * * *